United States Patent [19]

Opower

[11] Patent Number: 4,939,738
[45] Date of Patent: Jul. 3, 1990

[54] HIGH-POWER WAVEGUIDE LASER
[75] Inventor: Hans Opower, Krailling, Fed. Rep. of Germany
[73] Assignee: Deutsche Forschung -und Versuchsanstalt, Bonn, Fed. Rep. of Germany
[21] Appl. No.: 403,074
[22] Filed: Aug. 30, 1989

Related U.S. Application Data

[63] Continuation of Ser. No. 238,693, Aug. 30, 1988, abandoned.

[30] Foreign Application Priority Data

Aug. 31, 1987 [DE] Fed. Rep. of Germany ....... 3729053

[51] Int. Cl.$^5$ .............................................. H01S 3/08
[52] U.S. Cl. ...................................... 372/95; 372/35; 372/64; 372/83; 372/93; 372/99
[58] Field of Search ....................... 372/95, 64, 34, 35, 372/92, 93, 83, 87, 99, 103, 108

[56] References Cited

U.S. PATENT DOCUMENTS

| | | | |
|---|---|---|---|
| 3,386,043 | 5/1968 | Marcatili | 330/4.3 |
| 3,772,611 | 11/1973 | Smith | 372/96 |
| 3,873,942 | 3/1975 | Reilly | 372/95 |
| 4,079,340 | 3/1978 | Weiner et al. | 331/94.5 P |
| 4,426,705 | 1/1984 | Stevison et al. | 372/93 |
| 4,433,418 | 2/1984 | Smith | 372/95 |
| 4,455,658 | 6/1984 | Sutter, Jr. | 372/87 |
| 4,481,634 | 11/1984 | Grossman et al. | 372/87 |
| 4,559,627 | 12/1985 | Chun | 372/92 |
| 4,646,314 | 2/1987 | Opower | 372/95 |
| 4,719,639 | 1/1988 | Tulip | 372/95 |
| 4,739,508 | 4/1988 | Clark | 372/95 |

FOREIGN PATENT DOCUMENTS

| | | |
|---|---|---|
| 0043454 | 1/1982 | European Pat. Off. |
| 2608830 | 9/1977 | Fed. Rep. of Germany |
| 2735299 | 2/1979 | Fed. Rep. of Germany |
| 2919709 | 11/1980 | Fed. Rep. of Germany |
| 3035143 | 4/1981 | Fed. Rep. of Germany |
| 2060989 | 5/1981 | United Kingdom |
| 84/03695 | 9/1984 | World Int. Prop. O. |
| 86/07655 | 12/1986 | World Int. Prop. O. |

OTHER PUBLICATIONS

Borghese et al.; "Unstable-Stable Resonators with Toroidal Mirrors"; Applied Optics, vol. 20, No. 20; 10/15/1981; pp. 3547-3552.
"Ten-Atmospheres High Repetition Rate rf-Excited $CO_2$ Waveguide Laser", S. Lovold et al., Applied Physics Letters, vol. 40, No. 1, Jan. 1, 1982.
"Optical Gain Measurements at 10.6 $\mu$m in an 80 $\mu$m Hollow-Core Slab Waveguide", R. O. Miles et al., I.E.E.E. Journal of Quantum Electronics, vol. QE-17, No. 6, Jun., 1981.
"A Novel Stable-Unstable Resonator for Beam Control of Rare-Gas Halide Lasers", O. L. Bourne et al., Optics Communications, vol. 31, No. 2, Nov., 1979.
"Off-Axis Unstable Laser Resonator: Operation", E. A. Phillips et al., Applied Optics, vol. 15, No. 9, Sep., 1976.
"Radio-Frequency-Excited Carbon Dioxide Metal Waveguide Laser", Jonathan G. Grossman et al., Applied Optics, vol. 22, No. 9, May, 1983.
"Lasertechnik", Dr. A. Huthig, pp. 131 to 136, 1982.
"GaAs Lasers Utilizing Light Propagation Along Curved Junctions", John H. Carran et al., I.E.E.E. Journal of Quantum Electronics, vol. QE-6, No. 6, Jun., 1970.

Primary Examiner—Frank Gonzalez
Attorney, Agent, or Firm—Kramer, Brufsky & Cifelli

[57] ABSTRACT

In order to improve an electrically excited, diffusion-cooled highpower laser comprising two wall surfaces slightly spaced from one another and forming an optical waveguide, the width of the wall surfaces being a multiple of the space between them and the surfaces enclosing between them a flow-free discharge chamber, and also comprising an optical resonator having resonator mirrors disposed at both ends of said waveguide, such that his results in a laser beam which can be well focused, it is suggested that the resonator be an optically unstable resonator including a beam path extending lengthwise of a resonator axis and having an expansion transverse to the resonator axis extending as far as at least one exiting laser beam and that the transverse expansion extend transversely to a longitudinal direction of the waveguide and approximately parallel to the wall surfaces.

29 Claims, 5 Drawing Sheets

HIGH-POWER WAVEGUIDE LASER

This application is a continuation of application Ser. No. 238,693, filed Aug. 30, 1988 now abandoned.

TECHNICAL FIELD OF THE INVENTION

The invention relates to an electrically excited, diffusion-cooled, high power laser.

BACKGROUND OF THE INVENTION

Electrically excited lasers are known from German patent specifications DE-PS 26 08 830 and DE-PS 27 35 299. In these lasers the discharge chamber is enclosed between. the wall surfaces of a waveguide. These lasers do, however, operate with customary resonators having mirrors which are either ground so as to be plane or are concavely curved, i.e. these are optically stable resonators. These waveguide lasers generally have a plurality of laser regions which are not optically interconnected and which are decoupled in particular transversely to the optical axis of the resonators.

This plurality of laser regions arranged side by side has the disadvantage that the laser beams coupled out of these regions cannot be advantageously combined with one another since the laser regions do not operate exactly phase-coupled and so the entire laser arrangement does not oscillate in a unified manner which is required for commercial use, in particular for good focusing.

This disadvantage is particularly serious when a diffusion-cooled waveguide laser of this type is intended to produce high power output. In order to overcome the resulting loss of power it is imperative to construct the discharge chamber so that it has as large a volume as possible and the waveguide so that it is relatively broad since the thickness of the waveguide cannot be increased in order not to lose the advantageous optical and thermal properties of the waveguide.

DISCLOSURE OF THE INVENTION

The object underlying the invention is therefore to improve a laser of the type in question such that this operates as a high-power laser having a good focusing mode.

This object is accomplished in accordance with the invention, in a laser having a closed discharge chamber of the type described at the beginning, by the resonator being an optically unstable resonator which includes a beam path extending lengthwise of a resonator axis and having an expansion transverse to the resonator axis extending as far as at least one exiting laser beam and by this transverse expansion extending transversely to a longitudinal direction of the waveguide and approximately parallel to the wall surfaces.

The advantage of the inventive arrangement is that by combining an optical waveguide with an optically unstable resonator the width of the waveguide does not have any disadvantageous influence whatsoever on the mode purity of the laser. On the contrary, the discharge chamber of the strip-like waveguide can be utilized over its entire width in an advantageous manner for laser amplification due to the transverse expansion of the beam path which extends in a single transverse direction approximately parallel to the breadth of the waveguide. This creates the basis for designing the advantageous diffusion-cooled waveguide as a high-power laser having a favourably focusable laser mode.

The resonator axis is to be understood as the optical axis, on which centers of curvature of the resonator mirrors are located, or the axis, on which resonator surfaces are vertically positioned ar their points of intersection therewith.

In order to achieve an optimum exploitation of the laser-active cavity in the waveguide, it is desirable to design the optically unstable resonator such that light beams reflected therefrom penetrate the entire discharge chamber in the waveguide. An optimum mode quality is, however, obtained only when the transverse expansion of the beam path of the resonator corresponds at the most to the width of the wall surfaces of the waveguide, i.e. does not extend laterally beyond the waveguide.

It is particularly advantageous, when the laser is to have as compact a structure as possible, for the optically unstable resonator to have a concave resonator mirror which completely covers a first broadside of the waveguide at its first end. Supplementary hereto, it has also proven advantageous for the optically unstable resonator to have a convex resonator mirror which partially covers a second broadside of said waveguide at its second end. This design of the resonator mirrors allows a compact construction and so the resonator mirrors do not project laterally beyond the waveguide. It is also possible for the resonator to cover the entire laser-active volume in the discharge chamber.

The optically unstable resonator according to the embodiment described above could be designed such that the convex resonator mirror is arranged in the center of the second broadside of the waveguide so that a laser beam can exit from the waveguide on both sides of the mirror. Since it is normally desirable to have a laser with only one laser beam, the convex resonator mirror is provided such that it extends as far as a side wall of the waveguide.

In principle, it would be possible to position the resonator such that the resonator axis extends at an angle to the longitudinal direction of the waveguide. In this case, however, it would not be possible to obtain an optimum utilization of the laser-active volume in the discharge chamber. For this reason, it is expedient for a resonator axis to extend parallel to the longitudinal direction of the waveguide.

It has proven advantageous, especially for achieving a parallel beam of laser rays, for the resonator to be a confocal resonator.

Resonators having a beam path, in which the outer respective beams extend parallel to one another, are especially suitable within the scope of the inventive solution.

This adaptation to the waveguide is at an optimum when the outer respective beams of the resonator extend along both outer side edges of the waveguide. On the one hand, the entire resonator cavity created by the waveguide is then exploited in the best possible way and, on the other hand, the beam path of the resonator does not reach beyond the waveguide which can lead to a reduction in optical quality and, in particular, to dissipation losses in the beam path extending beyond the waveguide.

An embodiment, in which the resonator axis extends along one side edge of the waveguide, has proven particularly advantageous within the scope of the inventive solution.

Particularly good results can be achieved when the resonator extends laterally of the resonator axis as half of a resonator symmetrical to the resonator axis.

Apart from the concave or convex curvature of the resonator mirrors predetermined by the transversal direction of reflection of the optically unstable resonator, the resonator mirrors can be, in principle, of any optional design in a direction at right angles to the wall surfaces. It is, for example, possible for both resonator mirrors to have a concave curvature in this direction in order to achieve a focusing effect on the light beams reflecting back in the direction of the waveguide. This has, however, proven to be unfavourable in conjunction with a waveguide. For this reason, an embodiment which is of the simplest possible construction and utilizes the entire discharge chamber is, in particular, provided with resonator mirrors which have mirror surfaces extending at right angles to the wall surfaces of the waveguide contiguous thereto, i.e. they are not curved in a direction at right angles to the wall surfaces and so the plane of curvature of the mirror surfaces runs parallel to the wall surfaces.

A particularly simple resonator, which can also be produced cheaply and with particularly high precision, is characterized by the resonator mirrors having cylindrical mirror surfaces.

The inventive waveguide is advantageously a striplike waveguide having plane wall surfaces extending transversely to the longitudinal direction since, in this case, the combination with an optically unstable resonator can be realized in a particularly advantageous manner.

Since the construction of the laser has to be as compact as possible for commercial use, it has proven expedient, in order to fulfill this requirement, for the waveguide to be curved in the longitudinal direction. Since the manner in which light is conveyed or guided in the waveguide is essentially derived from reflection, this curvature can be designed such that it does not have any appreciably disadvantageous effect and so a compact construction will be attained, especially due to the curvature of the waveguide, without the loss of any laser-active volume.

It is, however, possible to produce a laser which is even more compact when the waveguide is angled in the longitudinal direction; the waveguide of an especially preferred, compact version is angled several times in the longitudinal direction. However, the waveguide portions between the bends in the waveguide extend expediently in a straight line. In order to ensure that the beam positioning of an angled waveguide is at an optimum, it has proven appropriate for deflecting prisms to be provided between the waveguide portions extending in a straight line in the longitudinal direction, these prisms making a defined beam deviation possible.

This allows lasers to be built, in which the waveguide portions are positioned parallel to one another. A double beam deflection from one waveguide portion to the other via two consecutive deflecting members then occurs and waveguide portions are also appropriately provided between the consecutive deflecting members.

A type of sandwich construction of the inventive laser may be achieved when the waveguide portions are arranged one above the other and advantageously have identical dimensions.

The resonator mirrors themselves can, in principle, be arranged on the waveguide in any optional manner.

It is, however, particularly advantageous for the resonator mirrors to seal the waveguide so that a particularly simple, gastight seal for the laser gas contained in the discharge chamber can be achieved with the resonator mirrors. In this case, the inventive waveguide is closed both by the convex resonator mirror and by a coupling-out window also sealing the waveguide in this region.

The problem encountered during production of the embodiment described above, which has resonator mirrors sealing the waveguide, is that of exact orientation of the resonator mirrors relative to the longitudinal direction of the waveguide. For this reason, it is an advantage for the resonator mirrors to abut on the waveguide so as to overlap the wall surfaces and for the waveguide to be shaped in accordance with the mirror surfaces. In this case, a defined orientation of the resonator mirrors sealing the waveguide may already be achieved during production of the waveguide by designing it accordingly in the region of its ends.

The waveguide itself may be produced from the most varied materials. It is, for example, possible within the scope of the present invention for the wall surfaces to be made of metal. In a different embodiment, the wall surfaces are produced from a dielectric and bear platelike metallic electrodes on their outer sides. This type of coupling in is particularly favourable for high-frequency coupling in since the effect of the dielectric avoids formation of a current path, such as that occurring in certain cases between two metallic electrodes.

It has proven advantageous, in particular when a discharge current density is to be controlled in the discharge chamber, for the electrodes to be segmented so that the discharge current density between these electrodes is also controllable due to regulation of the high-frequency power coupled into the individual electrodes.

When the wall surfaces are produced from a dielectric, it can in some cases prove difficult to give these surfaces the optimum reflective properties required for a waveguide. For this reason, a suitable embodiment is provided with wall surfaces which have a conductive coating on their inner sides.

This conductive coating does, however, entail the risk of a current path possibly being formed and, with it, an uneven discharge occurring in the laser gas. To avoid this it can therefore be favourable for the conductive coating to be applied in segments.

Since all the heat resulting during the gas discharge has to be drawn off through the wall surfaces enclosing the discharge chamber, it has proven particularly expedient, within the scope of the present invention, for the walls having the wall surfaces to be penetrated by cooling channels.

Additional features and advantages of the invention are the subject matter of the following description as well as of the drawings showing several embodiments.

DETAILED DESCRIPTION OF THE INVENTION

Figure 1:
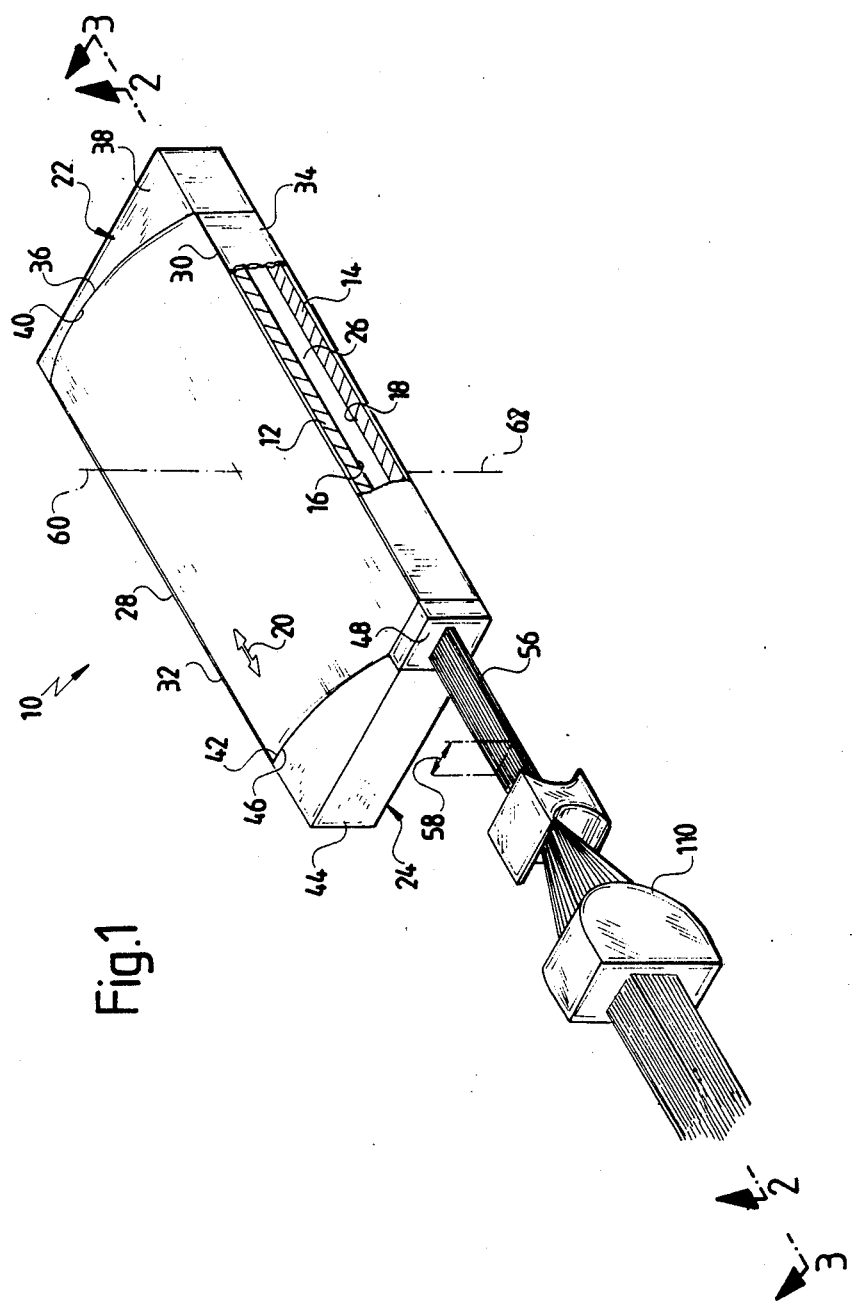
FIG. 1 is a partially cut-away perspective view of a first embodiment of the invention.
Figure 2:
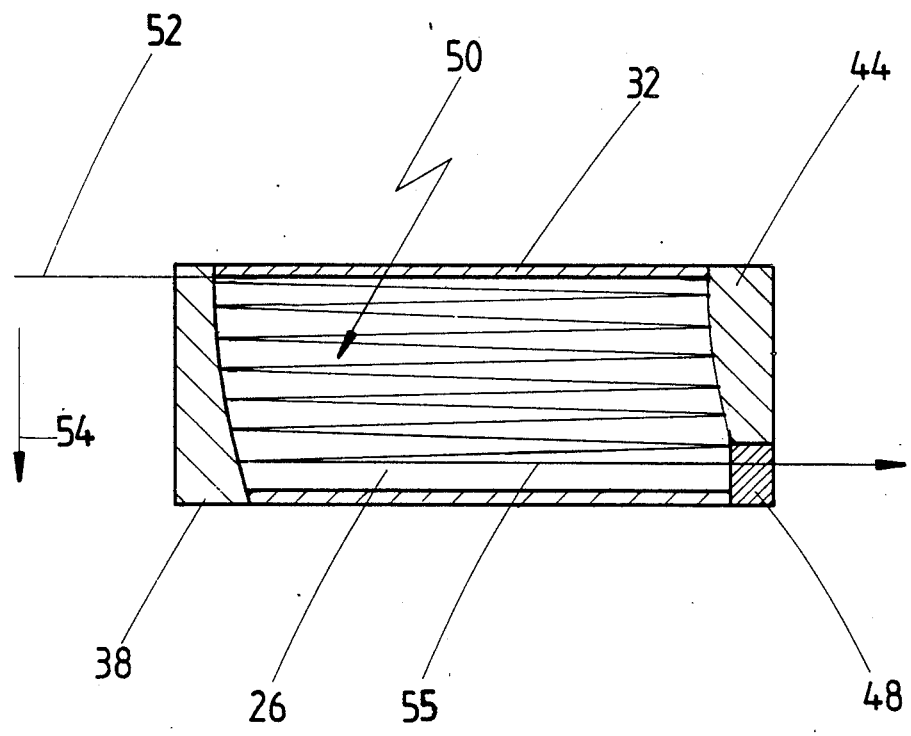
FIG. 2 is a section along line 2—2 in FIG. 1.

A first embodiment of an inventive laser, illustrated in FIGS. 1 and 2, comprises in detail an optical strip-like waveguide designated as a whole as 10. This strip-like waveguide is constructed of an upper wall 12 and a lower wall 14 which with their facing wall surfaces 16 and 18, respectively, are equidistant from one another and arranged one above the other. The two identical walls 12 and 14 extend in the longitudinal direction 20 of the waveguide 10 from a first end 22 as far as a second end 24 thereof. The extension of the walls 12 and 14 transverse to the longitudinal direction 20 is many times smaller than their extension in the longitudinal direction 20 and is, for example, 5 to 10 cm with the waveguide being between 30 and 60 cm in length. The space between the walls 12 and 14 is, for example, between 1 and 2 mm and in particularly favourable cases 1.5 mm.

A discharge chamber of the optical waveguide 10 which is enclosed between the facing wall surfaces 16 and 18 is limited in the lateral direction transverse to the longitudinal direction 20 by two side walls 32 and 34 extending along opposed longitudinal side edges 28 and 30 of the walls 12 and 14, respectively. These side walls cover the waveguide over its entire extension in the longitudinal direction 20. A first broadside 36 formed at the first end 22 of the waveguide 10 is covered by a concave resonator mirror 38 which overlaps the waveguide 10 with its walls 12 and 14 over their entire height in a direction at right angles to the wall surfaces 16 and 18. In order to bring about a tight seal between the waveguide 10 and the concave resonator mirror, the first broadside 36 is adapted to the shape of a mirror surface 40 of the concave resonator mirror 38 so that the waveguide 10 extends as far as the mirror surface 40 with both its walls 12 and 14 and its side walls 32 and 34 contiguous with the periphery of the mirror surface 40.

A second broadside 42 formed on the second end 24 is, starting at the side wall 32, covered by a convex resonator mirror 44. However, this convex resonator mirror 44 does not reach as far as the side wall 34 but leaves an opening free between itself and this side wall 34. Insofar as the walls 12 and 14 and the side wall 32 reach as far as the convex resonator mirror 44, they are also adapted to the shape of a mirror surface 46 of this convex resonator mirror, in order to be flush therewith. The second broadside 42 is closed between the convex resonator mirror 44 and the side wall 34 by a coupling-out window 48 which is adjoined to the convex resonator mirror 44, closes the opening remaining between this mirror and the side wall 34 and therefore completely covers the second broadside 42 together with the resonator mirror 44.

The coupling-out window 48 is hereby flush with the walls 12 and 14 reaching as far as the window as well as with the side wall 34.

The waveguide therefore forms, together with the resonator mirrors 38 and 44 and the coupling-out window 48, a unit which hermetically seals the discharge chamber 26.

In the embodiment illustrated in FIGS. 1 and 2 the concave resonator mirror 38 and the convex resonator mirror 44 form an optically unstable resonator 50 having a resonator axis 52 extending along the side wall 32. The optically unstable resonator extends from this resonator axis 52 in the transverse direction 54 as far as the side wall 34 and therefore represents half of a confocal resonator which is constructed symmetrically to the resonator axis 52 and has cylindrical mirror surfaces 40, 46, the focus and centers of curvature of which are located on the resonator axis 52 so that the mirror surfaces 40, 46 are positioned on the resonator axis so as to be at right angles thereto in the region of their points of intersection therewith.

In this optically unstable resonator 50, all the light waves spreading out in the longitudinal direction of the waveguide 10 are reflected back and forth between the concave resonator mirror 38 and the convex resonator mirror 44 until they reach the side wall 34 in the transverse direction 54 transversely to the longitudinal direction of the waveguide and, as indicated by beam direction 55, leave the waveguide 10 as a laser beam 56 through the coupling-out window 48. The laser beam 56 has a transversally electric mode with an electric vector 58 directed parallel to the wall surfaces 16 and 18. A laser gas in the discharge chamber 26, for example CO or $CO_2$, in particular $CO_2$ with He, $N_2$ in customary mixture ratios and advantageously with a small proportion of Xe, is excited by an electric discharge between the wall surfaces 16 and 18. For this purpose, the walls 12 and 14 are produced, for example, of metal. A high-frequency coupled in the range of MHz to GHz, in particular in the range of 80 to 400 MHz, is applied via the feed lines 60 and 62 which are connected with the wall surfaces 16 and 18, respectively. This coupling in then brings about an electric discharge, and with it an excitation of the laser gas, due to the high-frequency alternating electric field, which is formed between the wall surfaces 16 and 18, in the laser gas held in the discharge chamber 26 under corresponding underpressure, for example 100 to 200 mbar.

So that the optical waveguide 10 can be effective as such, it is necessary for the wall surfaces 16 and 18 to be designed for their part so that they are optically reflecting. In the case of metallic walls 12 and 14 this can be done by simply polishing them.

Figure 3:
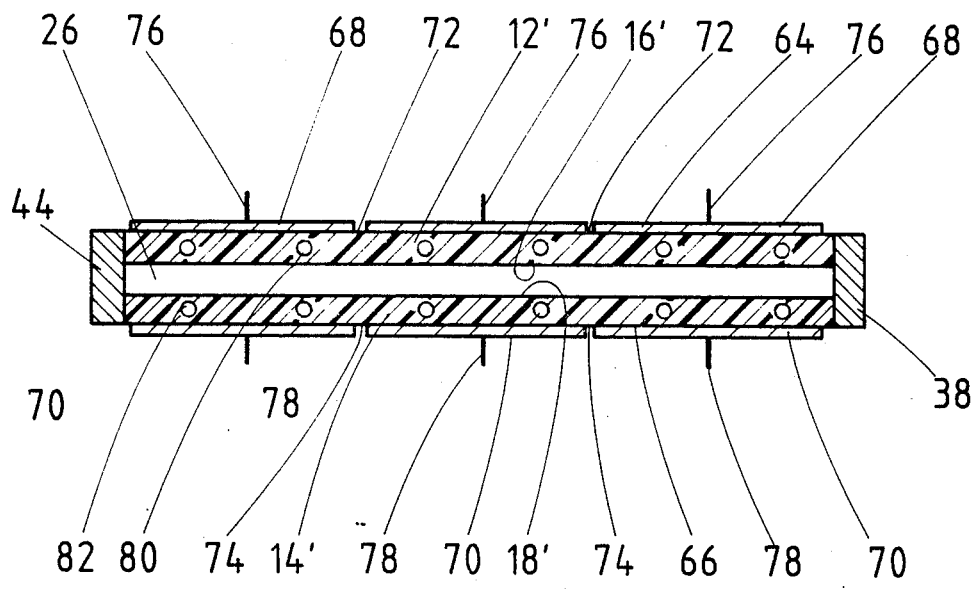
FIG. 3 is a section through a second embodiment similar to a section along line 3—3 in FIG. 1.

A second embodiment of the inventive laser is illustrated in FIG. 3. Insofar as the parts used are the same as in the first embodiment, these are given the same reference numerals and so reference can be made to the above remarks regarding their description. Insofar as the parts are modified, these are given the same reference numerals but with an apostrophe added.

The first embodiment is modified in that the walls 12' and 14' are not made of metal but of a dielectric material. In this case, the wall surfaces 16' and 18' must be designed as surfaces reflecting the resulting laser rays. This is possible either by corresponding polishing or by applying a corresponding, reflecting coating.

In order to be able to bring about an electric discharge in the discharge chamber 26, metal plates 68 and 70 are applied in the second embodiment to outer sides 64 and 66 of the walls 12' and 14', respectively. These metal plates now bring about a dielectric discharge in the discharge chamber 26 due to the electric walls 12' and 14'. This arrangement has the advantage that due to the dielectric walls 12' and 14' formation of a current path in the discharge chamber can be prevented. It is advantageous to provide a plurality of metal plates 68 and 70 on each outer side 64 and 66, respectively. These plates each extend transversely to the longitudinal direction 20 over the entire width of the respective outer sides 64 and 66 but are separated from one another in the longitudinal direction 20 of the respective outer sides 64 and 66 by gaps 72 and 74, respectively. This gives rise to individual segments which enable a defined electric field to be generated in the discharge chamber 26 as a function of the longitudinal direction 20 and for the discharge in particular in the discharge chamber 26 to be more homogeneous. For this purpose, each of the metal plates 68 and 70 is provided with a separate high-frequency connection 76 and 78, respectively.

In order to be able to draw off, particularly in high-power lasers, the heat resulting in the discharge chamber 26 and conveyed by diffusion to the walls 12' and 14', the second embodiment is provided, in addition, with cooling channels 80 and 82 in the walls 12' and 14', respectively. In the illustrated embodiment, these channels penetrate the walls 12' and 14' transversely to the longitudinal direction 20. It is, however, also possible for the cooling channels to penetrate the walls 12' and 14' in the longitudinal direction.

Figure 4:
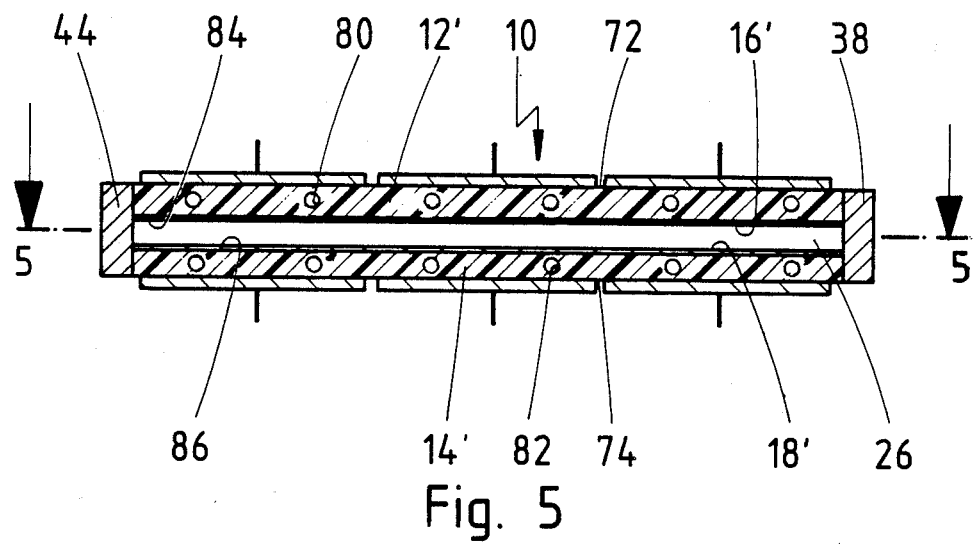
FIG. 4 is a section through a third embodiment similar to FIG. 3.
Figure 5:
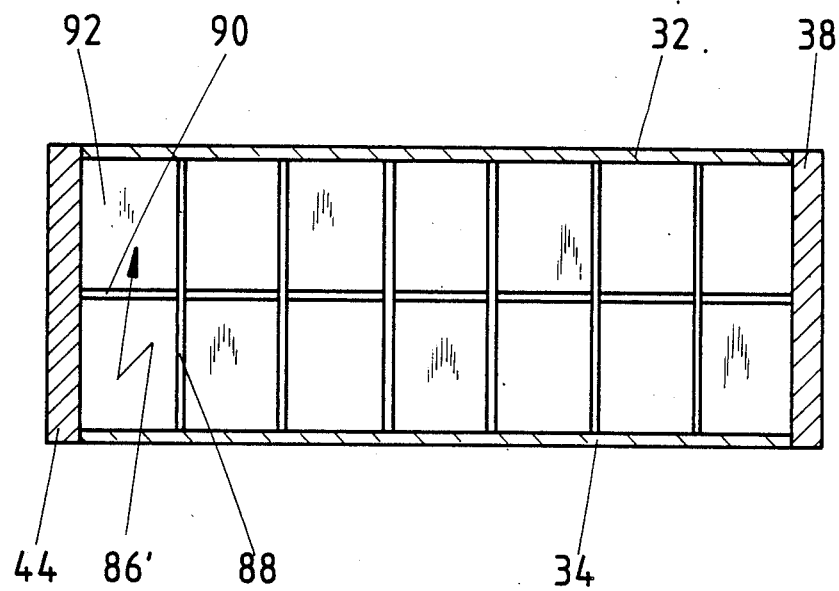
FIG. 5 is a section through a fourth embodiment similar to a section along line 5—5 in FIG. 4.

A third embodiment, illustrated in FIG. 4, represents a variation of the second embodiment, illustrated in FIG. 3. Insofar as the parts are the same as those used in FIG. 3, these have been given the same reference numerals. Supplementary to the second embodiment, the third embodiment has dielectric walls 12' and 14' with wall surfaces 16' and 18' which are provided on their inner sides, as well, with a metallic coating 84 and 86, respectively. This metallic coating which generally has a thickness in the $\mu$ range has good optical reflective properties which result in a very good optical conductivity of the waveguide 10. This metallic coating 86 can be applied, as shown in FIG. 4, as a continuous layer. It is, however, possible to divide the metallic coating, as illustrated on the basis of a fourth embodiment in FIG. 5, into individual segments 92 by means of dielectric strips 88 and 90, both in the longitudinal direction 20 as well as transversely thereto. This may be necessary when there is a tendency in the discharge chamber 26 to form a current path and so the segments 92 will enable the discharge to be more homogeneous.

Figure 6:
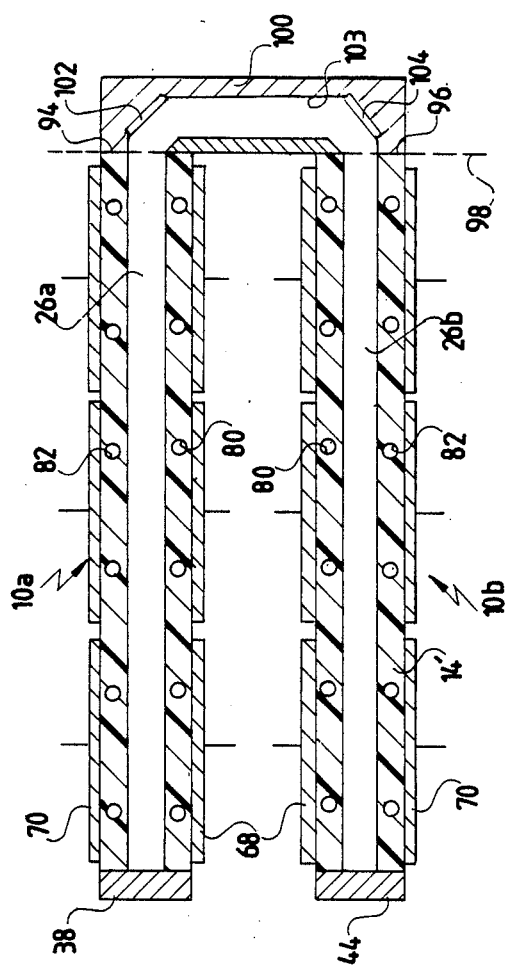
FIG. 6 is a longitudinal section through a fifth embodiment.

A fifth embodiment, illustrated in FIG. 6, is based on the second embodiment shown in FIG. 3 but with the difference that the waveguide 10 is divided into two waveguide portions 10a and 10b which are superposed and aligned parallel to one another. These portions are also arranged such that their sectional planes 94 and 96 are located in a common plane 98. An optical connection can then be provided between the two discharge chambers 26a and 26b by a connecting member 100 which overlaps the two sectional planes 94 and 96 and has a deflecting member 102 facing the discharge chamber 26a. This deflecting member deflects a light beam towards a deflecting member 104 facing the discharge chamber 26b. This deflecting member deflects the light beam into the discharge chamber 26 again so that all the rays of light striking the deflecting members 102 and 104 are deflected into the other discharge chamber 26b or 26a, respectively. It is advantageous for the deflecting members 102 and 104 to be designed as mirrors and arranged in a channel 103 in the connecting member 100 which connects the discharge chambers 26a, b with one another.

In the fifth embodiment according to FIG. 6, the two laser mirrors 38 and 44 are provided opposite to the connecting member 100. However, the entire light path from one mirror to the other has to be taken into consideration for the curvature of the laser mirrors 38 and 44 to provide a confocal resonator.

This folded arrangement of a waveguide 10 having an optical axis angled in two places, as illustrated in the fifth embodiment, has the advantage that it is considerably more compact and therefore the high-frequency coupled into the metal plates 68 and 70 as well as the feed lines to the cooling channels 80 and 82 can be arranged in a more simple manner.

Figure 7:
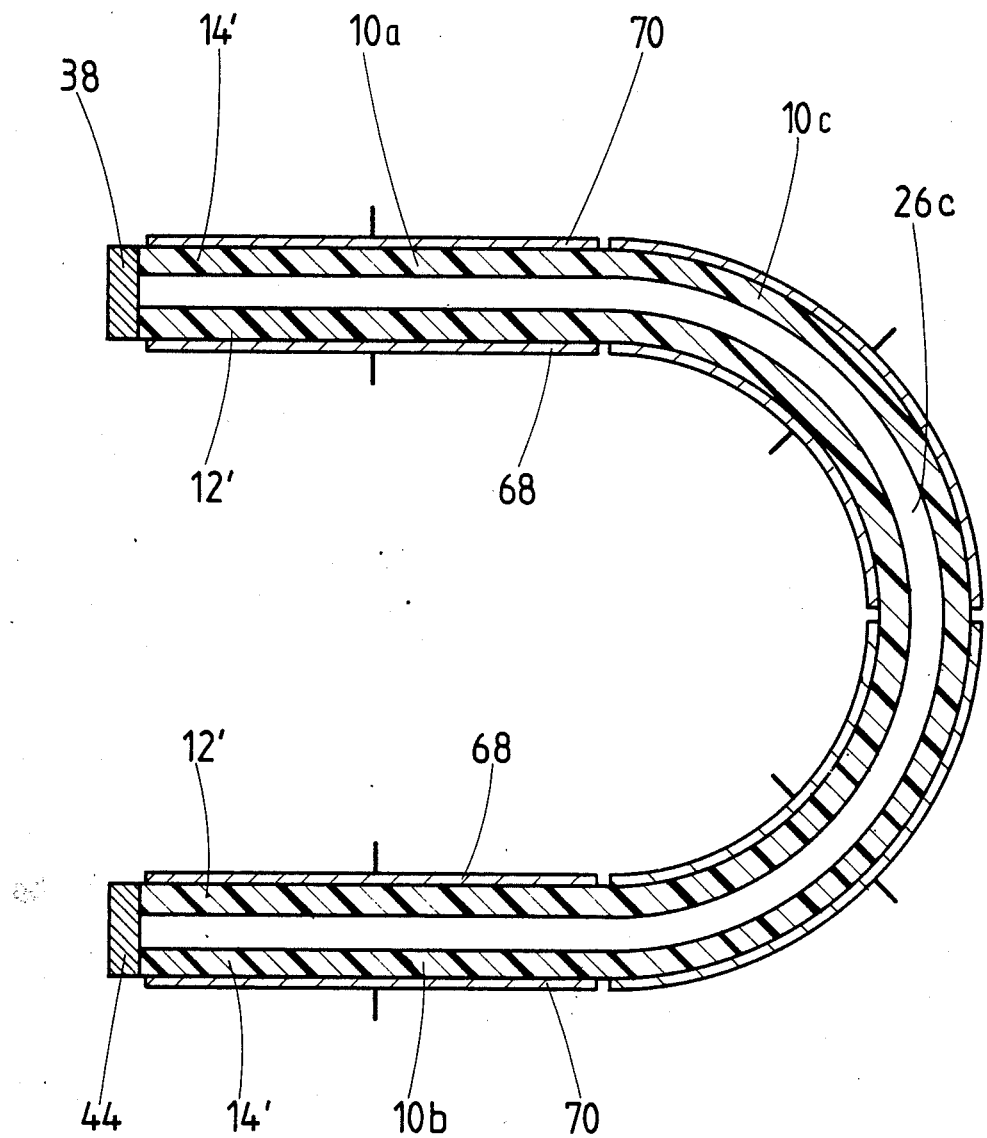
FIG. 7 is a longitudinal section through a sixth embodiment.

A further possibility of a compact construction for the inventive laser is shown in FIG. 7. This sixth embodiment again comprises two straight-line waveguide portions 10a and 10b. These are not, however, connected with one another by a connecting member 100 causing a double deflection of the optical axis due to deflecting members 102 and 104 but by a curved waveguide portion 10c which is joined to the waveguide portion 10b.

Due to the fact that the guidance of light in an optical waveguide results essentially due to reflection on the wall surfaces 16 and 18, it is also possible to produce a curved waveguide portion 10c which enables optical light to be guided in the same way as in the straight-line waveguide portions 10a and 10b. In addition, it is still possible to produce a gas discharge in the curved waveguide portion and thereby attain an optical amplification in the discharge chamber 26c of the curved waveguide portion due to the laser-active volume contained therein. This sixth embodiment is slightly less compact than the fifth embodiment but does make it possible to have a laser-active medium and amplification along the entire optical path within the waveguide 10. Otherwise, this sixth embodiment is comparable with the second embodiment according to FIG. 3, the only difference being that the walls 12' and 14', as well as the electrodes 68 and 70 must automatically be curved in the curved waveguide portion 10c.

In all the embodiments comprising dielectric walls 12' and 14', these are preferably produced from a ceramic material, in particular $Al_2O_3$, BeO or AlO.

The laser beam 56 generated with such a laser has a rectangular cross section. It can, however, as illustrated in FIG. 1, be expanded with a cylindrical optical means 110 to form a laser beam which is symmetrical on all sides and can, for its part, be well focused.

What is claimed is:

1. An electrically excited, diffusion-cooled high-power gas laser, comprising:
    an optical waveguide formed by two constantly spaced wall surfaces extending in a longitudinal direction between two ends of said waveguide and in transverse direction to two outer side edges of waveguide and having a transverse width being a multiple of the space between them;
    excitation means for applying high-frequency electrical energy to the wall surfaces;
    a flow-free discharge chamber for a laser gas enclosed in one direction by said wall surfaces;
    an optical resonator having first and second resonating mirrors disposed at first and second ends, respectively, of said optical waveguide, said resonator being an optically unstable resonator including a beam path extending lengthwise of a resonator axis oriented approximately parallel to said longitudinal direction and said beam path expanding transversely to said resonator axis;
    said resonator being arranged with respect to said waveguide such that said tranverse expansion of said beam path in a direction perpendicular to the wall surfaces extends over said space and, in a direction parallel to said wall surfaces, extends between said outer side edges of said waveguide and at the most to said outer side edges.

2. High-power laser as defined in claim 1, wherein the beam path extends between the outer side edges.

3. High-power laser as defined in claim 2, wherein the first resonating mirror disposed at the first end of said optically unstable resonator is a concave resonator mirror completely covering a first broadside of said waveguide at said first end.

4. High-power laser as defined in claim 3, wherein the second resonating mirror disposed at the second end of said optically unstable resonator is a convex resonator mirror partially covering a second broadside of said second end.

5. High-power laser as defined in claim 4, wherein said second, convex resonator mirror extends in one direction as far as one of said outer edges of said waveguide.

6. High-power laser as defined in claim 1, wherein the resonator axis extends parallel to said longitudinal direction of said waveguide.

7. High-power laser as defined in claim 1, wherein said resonator is a confocal resonator.

8. High-power laser as defined in claim 1, wherein said resonator has a beam path having outer respective beams extending parallel to one another.

9. High-power laser as defined in claim 8, wherein said outer respective beams of said resonator extend along said two outer side edges of said waveguide.

10. High-power laser as defined in claim 6, wherein said resonator axis extends along one of the two side edges of said waveguide.

11. High-power laser as defined in claim 6, wherein said resonator extends laterally of said resonator axis as half of a resonator symmetrical to said resonator axis.

12. High-power laser as defined in claim 1, wherein said resonator mirrors have mirror surfaces extending at right angles to the wall surfaces of said waveguide and are contiguous therewith.

13. High-power laser as defined in claim 12, wherein said resonator mirrors have cylindrical mirror surfaces.

14. High-power laser as defined in claim 1, wherein said waveguide is a strip-type waveguide having plane wall surfaces extending transversely to the longitudinal direction.

15. High-power laser as defined in claim 1, wherein said waveguide is curved in the longitudinal direction.

16. High-power laser as defined in claim 1, wherein said waveguide is angle in the longitudinal direction.

17. High-power laser as defined in claim 16, wherein said waveguide is angled at least twice in the longitudinal direction.

18. High-power laser as defined in claim 16, wherein the waveguide includes at least two waveguiding portions, each waveguide portion extending in a straight line in the longitudinal direction; and further comprising at least one deflecting member provided between contiguous waveguide portions.

19. High-power laser as defined in claim 18, wherein two of the at least two waveguide portions are disposed parallel to one another.

20. High-power laser as defined in claim 18, wherein two of the at least two waveguide portions are arranged one above the other.

21. High-power laser as defined in claim 1, wherein said resonator mirrors are sealed to said waveguide.

22. High-power laser as defined in claim 21, wherein said resonator mirrors abut against said waveguide so as to overlap said wall surfaces and said waveguide is shaped in accordance with mirror surfaces of said mirrors.

23. High-power laser as defined in claim 1, wherein said wall surfaces are made of metal.

24. High-power laser as defined in claim 1, wherein said wall surfaces include an inner layer formed of a dielectric material and an outer layer bearing plate-like electrodes.

25. High-power laser as defined in claim 24, wherein said electrodes are segmented by gaps.

26. High-power laser as defined in claim 1, wherein said wall surfaces are formed of a dielectric material, and the inside of said wall surfaces are provided with a conductive coating.

27. High-power laser as defined in claim 26, wherein said conductive coating is segmented.

28. High-power laser as defined in claim 1, wherein said wall surfaces are penetrated by cooling channels.

29. High-power laser as defined in claim 1, further comprising cylindrical optical means disposed external to the resonator for forming a beam of rays symmetrical on all sides from a laser beam coupled out of said resonator.

* * * * *

UNITED STATES PATENT AND TRADEMARK OFFICE
CERTIFICATE OF CORRECTION

PATENT NO. : 4,939,738

DATED : July 3, 1990

INVENTOR(S) : Hans Opower

It is certified that error appears in the above-identified patent and that said Letters Patent is hereby corrected as shown below:

In claim 1, column 8, line 53, before "waveguide", insert -- said -- .

In claim 4, column 9, line 17, before "second end.", insert -- waveguide at said -- .

In claim 16, column 10, line 4, change "angle" to -- angled -- .

In claim 18, column 10, line 9, change "waveguiding" to -- waveguide -- .

Signed and Sealed this

Ninth Day of July, 1991

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,939,738
DATED : July 3, 1990
INVENTOR(S) : Hans Opower

It is certified that error appears in the above-identified patent and that said Letters Patent is hereby corrected as shown below:

On the title page, item [73]

Correct the name of Assignee to read:

Deutsche Forschungs- und Versuchsanstalt
fuer Luft- und Raumfahrt e.V.

Signed and Sealed this

First Day of December, 1992

Attest:

DOUGLAS B. COMER

*Attesting Officer*   Acting Commissioner of Patents and Trademarks